(12) United States Patent
Tagashira et al.

(10) Patent No.: US 9,676,103 B2
(45) Date of Patent: Jun. 13, 2017

(54) MULTI-AXIS ROBOT POWER SHUT-OFF DEVICE AND MULTI-AXIS ROBOT

(71) Applicant: KAWASAKI JUKOGYO KABUSHIKI KAISHA, Kobe-shi, Hyogo (JP)

(72) Inventors: Tsuyoshi Tagashira, Kakogawa (JP); Kouji Munetou, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/024,789

(22) PCT Filed: Sep. 10, 2014

(86) PCT No.: PCT/JP2014/004664
§ 371 (c)(1),
(2) Date: Mar. 24, 2016

(87) PCT Pub. No.: WO2015/045300
PCT Pub. Date: Apr. 2, 2015

(65) Prior Publication Data
US 2016/0243710 A1     Aug. 25, 2016

(30) Foreign Application Priority Data
Sep. 24, 2013   (JP) ................................. 2013-197457

(51) Int. Cl.
*B25J 19/00*       (2006.01)
*B25J 19/06*       (2006.01)
(Continued)

(52) U.S. Cl.
CPC ........... *B25J 19/06* (2013.01); *B25J 19/0004* (2013.01); *H02P 3/04* (2013.01); *H02P 3/06* (2013.01)

(58) Field of Classification Search
CPC ......... B25J 19/0004; B25J 19/06; H02P 3/04; H02P 3/06
(Continued)

(56) References Cited

U.S. PATENT DOCUMENTS 4,693,665 A * 9/1987 Friederichs .............. B25J 9/046
188/72.4
5,497,057 A * 3/1996 Danielson ................. H02P 3/26
318/371
(Continued)

FOREIGN PATENT DOCUMENTS

CN      101896320 A      11/2010
CN      103095190 A      5/2013
(Continued)

OTHER PUBLICATIONS

Dec. 2, 2014 Search Report issued in International Patent Application No. PCT/JP2014/004664.
(Continued)

*Primary Examiner* — Rita Leykin
(74) *Attorney, Agent, or Firm* — Oliff PLC

(57) ABSTRACT

A plurality of motors, which drive plurality of axes of multi-axis robot, respectively; plurality of power converters, which control operation of plurality of motors, respectively, by supplying and controlling electric power to plurality of motors; drive circuits, each of which drives first semiconductor switching elements included in a corresponding one of power converters by outputting drive signals to control terminals of first semiconductor switching elements in accordance with control signals for controlling operation of the motors; shut-off circuit provided at non-end position in an electrical path, through which first operating power is supplied to drive circuits; and shut-off control circuit, which outputs shut-off signals to shut-off circuit. The shut-off circuit includes second semiconductor switching elements,
(Continued)

which are inserted in an electrical path in series to each other, second semiconductor switching elements turning off in accordance with shut-off signals, respectively, to shut off the electrical path.

6 Claims, 5 Drawing Sheets

(51) Int. Cl.
*H02P 3/04* (2006.01)
*H02P 3/06* (2006.01)

(58) Field of Classification Search
USPC .. 318/563, 34, 560, 568.11, 568.17, 568.21; 700/245; 901/2
See application file for complete search history.

(56) References Cited

U.S. PATENT DOCUMENTS

| | | | |
|---|---|---|---|
| 5,822,207 A * | 10/1998 | Hazama | B25J 9/1666 700/104 |
| 7,253,577 B2 | 8/2007 | Campbell et al. | |
| 8,763,488 B2 * | 7/2014 | Reekers | B25J 9/101 403/116 |
| 9,010,183 B2 * | 4/2015 | Haimer | G01M 1/16 73/460 |
| 9,183,346 B2 * | 11/2015 | Mihara | B25J 9/102 |
| 2002/0124377 A1 * | 9/2002 | Nakamura | B62D 65/02 29/430 |
| 2005/0122641 A1 | 6/2005 | Fullington et al. | |

FOREIGN PATENT DOCUMENTS

| | | |
|---|---|---|
| JP | H11-122981 A | 4/1999 |
| JP | 2005-161486 A | 6/2005 |
| JP | 2008-153748 A | 7/2008 |
| JP | 2008-187873 A | 8/2008 |
| JP | 2011-182535 A | 9/2011 |

OTHER PUBLICATIONS

Mar. 29, 2016 International Preliminary Report on Patentability issued in International Patent Application No. PCT/JP2014/004664.
Nov. 22, 2016 Office Action issued in Chinese Patent Application No. 201480051270.3.

* cited by examiner

MULTI-AXIS ROBOT POWER SHUT-OFF DEVICE AND MULTI-AXIS ROBOT

TECHNICAL FIELD

The present invention relates to a power shut-off device including a plurality of motors that drive a plurality of axes of a multi-axis robot, respectively, and also relates to the multi-axis robot.

BACKGROUND ART

In general, robots used as industrial robots and so forth are configured as multi-axis robots, each of which is provided with a plurality of motors that drive moving members necessary for operating the robot. When operating such a robot, the plurality of motors are operated at the same time to control the robot, and the robot is configured such that a safety circuit operates at the time of an emergency stop (see Patent Literature 1, for example).

In the conventional robots, the power of the motors is completely shut off by the safety circuit. In order to ensure that the motors will become unable to operate, such a conventional robot adopts, for example, a system that mechanically shuts off, by a magnet contactor, the power supply line of a three-phase AC power supply that operates the motors.

CITATION LIST

Patent Literature

PTL 1: U.S. Pat. No. 7,253,577
PTL 2: US Patent Application Publication No. 2005/122641
PTL 3: Japanese Laid-Open Patent Application Publication No. 2008-153748
PTL 4: Japanese Laid-Open Patent Application Publication No. 2011-182535
PTL 5: Japanese Laid-Open Patent Application Publication No. 2008-187873
PTL 6: Japanese Laid-Open Patent Application Publication No. H11-122981
PTL 7: Japanese Laid-Open Patent Application Publication No. 2005-161486

SUMMARY OF INVENTION

Technical Problem

However, the installation space for such a mechanical switch as the aforementioned magnet contactor is large, and the installation of such a mechanical switch has a major disadvantage in terms of cost. In addition, since the mechanical switch is a mechanical component, its life is limited.

The present invention has been made to solve the above conventional problems, and an object of the present invention is to provide a multi-axis robot including a shut-off circuit whose installation space and cost are less and whose life is longer than conventional shut-off circuits using a mechanical switch, the multi-axis robot being capable of safely and securely stopping its driving motors.

Solution to Problem

In order to solve the above conventional problems, a multi-axis robot power shut-off device according to one aspect of the present invention includes: a plurality of motors that drive a plurality of axes of a multi-axis robot, respectively; a plurality of power converters that control operation of the plurality of motors, respectively, by supplying and controlling electric power to the plurality of motors; drive circuits, each of which drives first semiconductor switching elements included in a corresponding one of the power converters by outputting drive signals to control terminals of the first semiconductor switching elements in accordance with control signals for controlling the operation of the motors; a first shut-off circuit provided at a non-end position in a first electrical path, through which first operating power is supplied to the drive circuits; a plurality of solenoid brakes that apply a brake to the plurality of axes, respectively; a second shut-off circuit provided at a non-end position in a second electrical path, through which second operating power is supplied to the solenoid brakes; and a shut-off control circuit that outputs shut-off signals to the first and second shut-off circuits. At least one of the first and second shut-off circuits (hereinafter, a specific shut-off circuit) includes at least two second semiconductor switching elements that are inserted in series to each other in one of the first and second electrical paths (hereinafter, a specific electrical path) that corresponds to the specific shut-off circuit, the second semiconductor switching elements turning off in accordance with the shut-off signals, respectively, to shut off the specific electrical path. In the description herein, among three essential terminals of each semiconductor switching element, a pair of terminals connected to an electrical path that is to be rendered in the state of conduction and the state of being shut off is defined as main terminals, and a terminal to which signals controlling the state of conduction and the state of being shut off are inputted is defined as a control terminal. For example, in the case of an FET, the source and the drain are the main terminals, and the gate is the control terminal. In the case of an IGBT and a bipolar transistor, the emitter and the collector are the main terminals, and the base is the control terminal.

According to the above configuration, since each shut-off circuit is formed by using semiconductor switching elements, integration of the shut-off circuit can be more facilitated compared to a conventional shut-off circuit including a mechanical switch such as a magnet contactor (hereinafter, a magnet contactor may be referred to as MC). As a result, the installation space can be reduced. Moreover, since the circuit configuration can be made at low cost by using an integrated circuit without use of mechanical switches, cost reduction of the shut-off circuit can be realized. Furthermore, since the semiconductor switching elements are turned on (state of conduction) and off (state of non-conduction) not by mechanical contact but by controlling carrier mobility in the semiconductor, the life of the shut-off circuit is extended. Still further, since the electrical path to be shut off is shut off by at least two semiconductor switching elements that are inserted in the electrical path in series to each other, even if one of the semiconductor switching elements breaks down, the specific electrical path can be shut off by the remaining semiconductor switching element(s). This improves safety. The semiconductor switching elements herein are, for example, transistors or thyristors. Specifically, the semiconductor switching elements are FETs. Alternatively, the semiconductor switching elements may be bipolar transistors or IGBTs.

The shut-off control circuit may regularly output a pulse to control terminals of the second semiconductor switching elements to turn off the second semiconductor switching elements, and make a diagnosis as to whether or not the second semiconductor switching elements turn off.

According to the above configuration, a self-diagnosis can be made regularly to determine whether or not the shut-off circuit is in a normal state. As a result, safety is improved.

In a case of defining the drive circuits and the solenoid brakes as loads, defining one of the at least two second semiconductor switching elements as a power-supply-side semiconductor switching element, and defining another one of the second semiconductor switching elements that is positioned closer to the loads than the power-supply-side semiconductor switching element as a load-side semiconductor switching element, the shut-off control circuit may further include: a first diagnosing circuit that outputs a first diagnostic signal containing the pulse to the control terminal of the power-supply-side semiconductor switching element; and a second diagnosing circuit that outputs a second diagnostic signal containing the pulse whose phase is different from that of the pulse of the first diagnostic signal to the control terminal of the load-side semiconductor switching element. The first diagnosing circuit may receive a response signal from a main terminal, at the load side, of the load-side semiconductor switching element, the response signal responding to the second diagnostic signal, and makes a diagnosis as to whether or not the load-side semiconductor switching element is operating normally, and the second diagnosing circuit may receive a response signal from a main terminal, at the load side, of the power-supply-side semiconductor switching element, the response signal responding to the first diagnostic signal, and makes a diagnosis as to whether or not the power-supply-side semiconductor switching element is operating normally.

According to the above configuration, the two diagnosing circuits check each other in such a manner that one diagnosing circuit checks whether or not the other diagnosing circuit outputs a diagnostic signal. In this manner, an erroneous diagnosis resulting from the absence of an output diagnostic signal can be prevented.

A multi-axis robot according to another aspect of the present invention includes the above-described multi-axis robot power shut-off device.

Advantageous Effects of Invention

The present invention provides an advantageous effect of being able to provide a multi-axis robot including a shut-off circuit whose installation space and cost are less and whose life is longer than conventional shut-off circuits using a mechanical switch, the multi-axis robot being capable of safely and securely stopping its driving motors.

The above object, other objects, features, and advantages of the present invention will be made clear by the following detailed description of preferred embodiments with reference to the accompanying drawings.

DESCRIPTION OF EMBODIMENTS

Hereinafter, one embodiment of the present invention is described with reference to the drawings.

Figure 1:
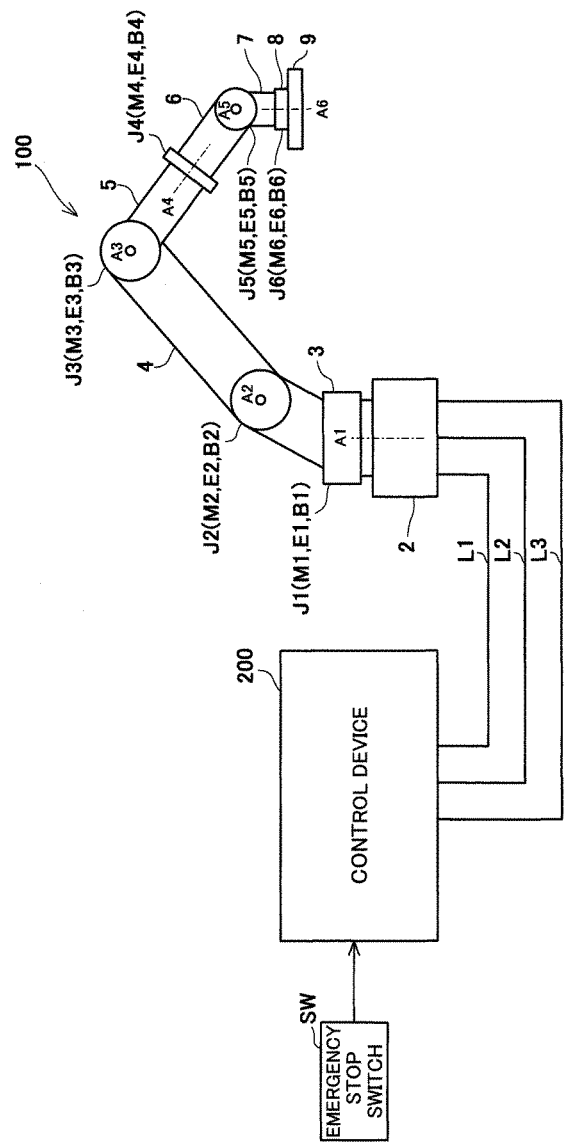
FIG. 1 shows the configuration of a multi-axis robot in which a multi-axis robot power shut-off device according to one embodiment of the present invention is used.

FIG. 1 shows the configuration of a multi-axis robot in which a multi-axis robot power shut-off device according to the present embodiment is used. In the present embodiment, the multi-axis robot is only required to: include a plurality of moving members necessary for operating the robot; and be configured to drive the plurality of moving members by a plurality of motors. Therefore, although the multi-axis robot according to the present embodiment is typically an articulated robot, the present embodiment is not thus limited. As shown in FIG. 1, as one example, a multi-axis robot 100 is configured as a six-axis robot that includes a wrist provided at a distal end of the robot and six joints J1 to J6 sequentially arranged from a predetermined proximal end of the robot to the wrist, and the six joints J1 to J6 have first to sixth rotational axes A1 to A6, respectively. A turn base 3, arm members 4 to 7, and an attachment 8 are installed consecutively on a base 2. It should be noted that a tool member 9 is detachably attached to a flange face of the attachment 8. The consecutively installed members 2 to 8 from the base 2 to the attachment 8 are connected to each other such that they are rotatable relative to each other. In the description below, the group of members 2 to 8 consecutively installed by the six joints J1 to J6 in this manner is called a robot arm.

Servomotors M1 to M6, brakes B1 to B6 applying a brake to the rotation of the servomotors M1 to M6, and position sensors E1 to E6 detecting rotation positions of the respective servomotors M1 to M6 are provided corresponding to the first to sixth joints J1 to J6, respectively. For example, DC servomotors are adopted as the servomotors M1 to M6. Encoders or resolvers are adopted as the position sensors E1 to E6, for example. As one example, non-excitation-actuated solenoid brakes that release a brake while being magnetically excited by supply of electric power and that apply a brake while not being magnetically excited are adopted as the brakes B1 to B6. By driving the servomotors M1 to M6, the servomotors M1 to M6 are allowed to rotate about the first to sixth rotational axes A1 to A6, respectively, at the first to sixth joints J1 to J6. It should be noted that the servomotors M1 to M6 can be caused to operate independently of each other. When the servomotors M1 to M6 operate, the position sensors E1 to E6 detect rotational positions of the respective servomotors M1 to M6 around the first to sixth rotational axes A1 to A6.

The servomotors M1 to M6 are connected to a control device 200 via a motor cable L1. The brakes B1 to B6 are connected to the control device 200 via a brake cable L2. The position sensors E1 to E6 are connected to the control device 200 via a position sensor cable L3. The motor cable L1 is a first electrical path for supplying electric power from the control device 200 to the servomotors M1 to M6. The brake cable L2 is a second electrical path for supplying electric power from the control device 200 to the brakes B1 to B6. The position sensor cable L3 is a third electrical path for supplying electric power from the control device 200 to the position sensors E1 to E6 and for supplying position detection signals from the position sensors E1 to E6 to the control device 200.

The control device 200 performs servo control of the servomotors M1 to M6 provided at the respective first to sixth joints J1 to J6, the servo control causing the tool member 9 to move along an intended path to be in an intended position and orientation. By the servo control, the multi-axis robot 100 performs predetermined operations. The use of the multi-axis robot 100 is not particularly limited.

At an emergency, the control device 200 exerts a power shut-off function of operating an emergency stop switch SW to shut off the power to the drive system of the servomotors M1 to M6 and operating the drive system of the brakes B1 to B6 to safely stop the robot arm of the multi-axis robot 100.

Figure 2:
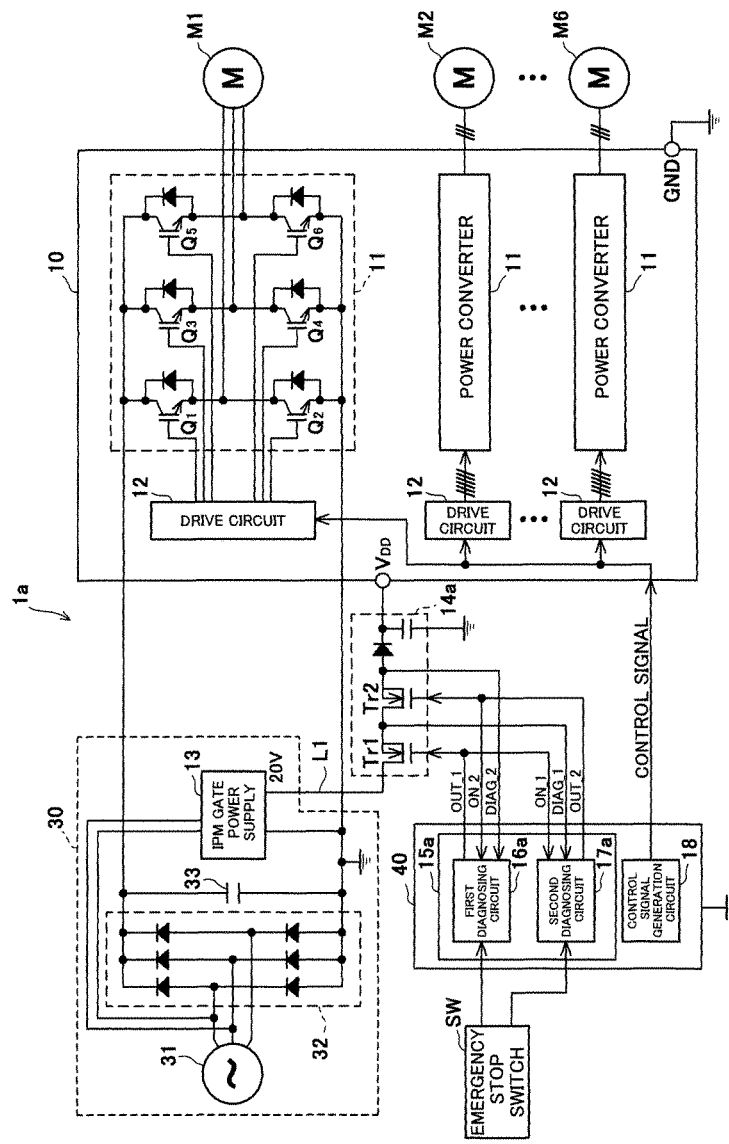
FIG. 2 is a circuit diagram showing one example of a circuit configuration of a power shut-off device of a motor-drive system of the multi-axis robot of FIG. 1.

FIG. 2 is a circuit diagram showing one example of a circuit configuration of a power shut-off device of the drive system of the servomotors M1 to M6. As shown in FIG. 2, a power shut-off device 1a includes: a plurality of power converters 11 corresponding to the plurality of servomotors M1 to M6, respectively; a plurality of drive circuits 12; an operating voltage generator 30; a shut-off circuit 14a; and a control unit 40 including a shut-off control circuit 15a.

The plurality of servomotors M1 to M6 drive the plurality of axes A1 to A6 of the multi-axis robot 100, respectively. In the description below, the plurality of servomotors M1 to M6 may be simply referred to as motors M1 to M6.

The plurality of power converters 11 control the operation of the motors M1 to M6, respectively, by supplying and controlling electric power to the corresponding motors M1 to M6. Each power converter 11 is a device that converts DC power into AC power. As one example, each power converter 11 is a three-phase bridge inverter circuit including semiconductor switching elements Q1 to Q6. In the present embodiment, the semiconductor switching elements Q1 to Q6 are configured as six IGBTs, to each of which a freewheeling diode is connected in an antiparallel manner.

Each of the plurality of drive circuits 12 drives the semiconductor switching elements Q1 to Q6 included in a corresponding one of the power converters 11 by outputting drive signals to control terminals of the semiconductor switching elements Q1 to Q6 in accordance with control signals for controlling the operation of the motors M1 to M6. In the present embodiment, each drive circuit 12 drives the IGBTs by outputting drive signals to gate terminals of the IGBTs.

In the present embodiment, the six power converters 11 and the six drive circuits 12 driving them are incorporated in an IPM (Intelligent Power Module) 10. The IPM 10 incorporates therein not only these circuits but also protective circuit functions that are not shown. Accordingly, the IPM 10 realizes protection from overheating, short-circuiting, abnormality in control circuit, etc. The IPM 10 is operated by supplying a power supply voltage, control signal, etc., to the IPM 10 from the outside.

The operating voltage generator 30 includes an AC power supply 31, an AC/DC converter 32, a smoothing capacitor 33, and an IPM gate power supply 13. The AC/DC converter 32, for example, converts three-phase AC power outputted from the AC power supply 31 into DC power, and outputs the DC power. The DC power is supplied to each power converter 11 in the IPM 10. In the present embodiment, the AC/DC converter 32 is a three-phase full-wave rectifier circuit, and is a bridge rectifier circuit formed by using six diodes. The smoothing capacitor 33 smooths a DC output voltage.

The IPM gate power supply 13 is a power supply circuit including therein such an AC/DC converter and a smoothing capacitor as described above (which are not shown). In the present embodiment, the IPM gate power supply 13 converts two-phase AC power outputted from the AC power supply 31 into smoothed DC power, steps down the voltage of the converted DC power (e.g., 200 V) to a predetermined voltage (e.g., 20V), and supplies the voltage to a positive supply terminal $V_{DD}$ of the IPM. The IPM gate power supply 13 supplies a power supply voltage as operating power to predetermined elements inside the IPM 4 including the drive circuits 12 through the electrical path L1. It should be noted that the power supply voltage from the IPM gate power supply 13 is supplied not only to the IPM 10 but also to the shut-off control circuit 15.

The shut-off circuit 14a is provided at a non-end position in the electrical path L1, through which the power supply voltage is supplied as the operating power to the IPM 10 including the drive circuits 12. The shut-off circuit 14a includes at least two semiconductor switching elements that are inserted in the electrical path L1 in series to each other. The semiconductor switching elements turn off in accordance with shut-off signals from the shut-off control circuit 15a, respectively, to shut off the electrical path L1. In this manner, the electrical path L1 is shut off by the at least two semiconductor switching elements inserted in series to each other in the electrical path L1, which is to be shut off. Therefore, even if one of the semiconductor switching elements breaks down, the specific electrical path can be shut off by the remaining semiconductor switching elements (s). This improves safety. In the present embodiment, two semiconductor switching elements Tr1 and Tr2 are connected to the electrical path L1 in series to each other. The semiconductor switching elements Tr1 and Tr2 are transistors, for example. Specifically, the semiconductor switching elements Tr1 and Tr2 are two n-channel FETs. Alternatively, the semiconductor switching elements Tr1 and Tr2 may be bipolar transistors or IGBTs.

As described above, since the shut-off circuit 14a is formed by using the semiconductor switching elements, integration can be more facilitated compared to a conventional shut-off circuit including a mechanical switch such as a magnet contactor. As a result, the installation space can be reduced. Moreover, since the circuit configuration can be made at low cost by using an integrated circuit without use of mechanical switches, cost reduction can be realized. Furthermore, since the semiconductor switching elements are turned on (state of conduction) and off (state of non-conduction) not by mechanical contact but by controlling carrier mobility in the semiconductor, the life of the shut-off circuit 14a is extended.

In the description below, the drive circuits 12 are defined as loads; one of the two semiconductor switching elements Tr1 and Tr2 is defined as a first transistor (a power-supply-side semiconductor switching element) Tr1; and the other one of the two semiconductor switching elements, which is positioned closer to the loads than the first transistor Tr1, is defined as a second transistor (a load-side semiconductor switching element) Tr2. In the shut-off circuit 14a, an output circuit (a filter) including a diode and a capacitor is connected to the load side of the second transistor Tr2. Owing to this configuration, even if the first transistor Tr1 and the second transistor Tr1 are turned off momentarily by a first diagnostic signal and a second diagnostic signal, respectively, which are described below, electric power is supplied from the capacitor of the output circuit to the drive circuits 12 of the IPM 10, and thereby substantially constant electric power (voltage) is supplied to the drive circuits 12 of the IPM 10.

The control unit 40 manages the control of the entire control device 200 controlling the multi-axis robot 100, and includes the shut-off control circuit 15a, a control signal generation circuit 18 generating a control signal, another shut-off control circuit of a brake system described below, etc. The control unit 40 may be configured as a microcontroller, CPU, MPU, DSP, ASIC, or FPGA, for example. The control unit 40 may be formed by using a plurality of controllers that control each other by distributed control.

At an emergency, the shut-off control circuit 15a outputs shut-off signals to shut off the shut-off circuit 14a in accordance with a stop operation of the emergency stop switch SW. At normal times, the shut-off control circuit 15a outputs diagnostic signals to perform self-diagnosis for determining whether or not the shut-off circuit 14a is in a normal state. Specifically, the shut-off control circuit 15a further includes: a first diagnosing circuit 16a, which outputs a first shut-off signal or first diagnostic signal containing a pulse to a control terminal of the first transistor Tr1; and a second diagnosing circuit 17a, which outputs a second shut-off signal or second diagnostic signal containing a pulse to a control terminal of the second transistor Tr2. In the present embodiment, the first diagnosing circuit 16a and the second diagnosing circuit 17a are each configured as a CPLD (Complex Programmable Logic Device).

Figure 3:
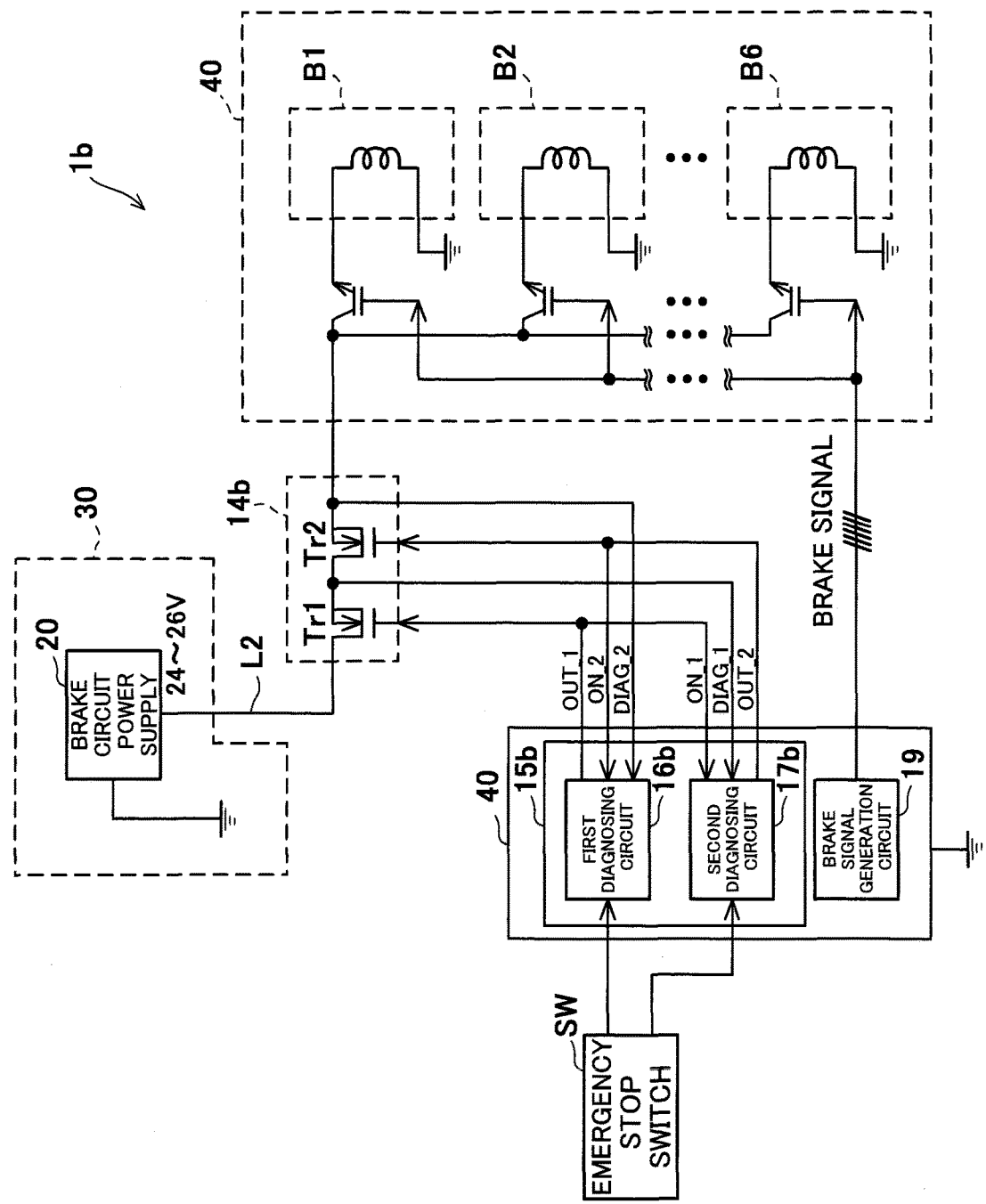
FIG. 3 is a circuit diagram showing one example of a circuit configuration of a power shut-off device of a brake system of the multi-axis robot of FIG. 1.

FIG. 3 is a circuit diagram showing one example of a circuit configuration of a power shut-off device of the system of brakes B1 to B6 of the multi-axis robot 100. As shown in FIG. 3, a power shut-off device 1b includes: a brake circuit 50 including a plurality of solenoid brakes B1 to B6, which apply a brake to a plurality of axes, respectively; a brake circuit power supply 20, which generates operating power to be supplied to each solenoid brake in the brake circuit 50; a shut-off circuit 14b; and the control unit 40 including a shut-off control circuit 15b and a brake signal generation circuit 19 generating a brake signal.

The brake circuit 50 includes: the plurality of solenoid brakes B1 to B6, which apply a brake to a plurality of axes, respectively; and transistors corresponding to the respective solenoid brakes and serving as switching elements, each of which switches between the state of excitation and the state of non-excitation in accordance with the brake signal from the brake signal generation circuit 19.

The brake circuit power supply 20 is a power supply circuit that steps down a DC power voltage (e.g., 200 V) outputted from the AC/DC converter 32 of the operating voltage generator 30 shown in FIG. 2 to a predetermined voltage (e.g., 24 to 26 V) to supply operating power to the brake circuit 50.

The shut-off circuit 14b is provided at a non-end position in the electrical path L2, through which the operating power is supplied to each solenoid brake in the brake circuit 50. The shut-off circuit 14b includes at least two semiconductor switching elements that are inserted in the electrical path L2 in series to each other. The semiconductor switching elements turn off in accordance with shut-off signals from the shut-off control circuit 15b, respectively, to shut off the electrical path L2. In the present embodiment, two semiconductor switching elements Tr1 and Tr2 are connected to the electrical path L2 in series to each other. The semiconductor switching elements Tr1 and Tr2 are transistors, for example. Specifically, the semiconductor switching elements Tr1 and Tr2 are two n-channel FETs. The shut-off circuit 14b is different from the shut-off circuit 14a in that, in the shut-off circuit 14b, a filter circuit containing a diode and a capacitor is not connected to the load side of the second transistor Tr2. The reason for this is as follows: since the inductance of the electromagnetic coil in each solenoid brake is relatively large, even if the first transistor Tr1 and the second transistor Tr1 are turned off momentarily by a first diagnostic signal and a second diagnostic signal, respectively, which are described below, current change is prevented by the inductance, and thereby substantially constant electric power (current) is supplied to each solenoid brake. For this reason, the output circuit as previously described is unnecessary.

In the description below, the solenoid brakes B1 to B6 are defined as loads; one of the two semiconductor switching elements is defined as a first transistor (a power-supply-side semiconductor switching element) Tr1; the other one of the two semiconductor switching elements, which is positioned closer to the loads than the first transistor Tr1, is defined as a second transistor (a load-side semiconductor switching element) Tr2.

Similar to the power shut-off device 1a of the motor-drive system, the shut-off control circuit 15b in the power shut-off device 1b of the brake system includes a first diagnosing circuit 16b and a second diagnosing circuit 17b. Since the first diagnosing circuit 16b and the second diagnosing circuit 17b are configured in the same manner as the first diagnosing circuit 16a and the second diagnosing circuit 17a, the description of the configurations of the first diagnosing circuit 16b and the second diagnosing circuit 17b is omitted.

Hereinafter, shut-off controls in the power shut-off device 1a of the motor-drive system and the power shut-off device 1b of the brake system as described above are described with reference to FIG. 2. At an emergency, the shut-off control circuit 15a in the power shut-off device 1a of FIG. 2 outputs shut-off signals to shut off the shut-off circuit 14a in accordance with a stop operation of the emergency stop switch SW. Specifically, the first diagnosing circuit 16a outputs a first shut-off signal OUT_1 containing a pulse to a control terminal of the first transistor Tr1 to shut off the first transistor Tr1 of the shut-off circuit 14a. Meanwhile, the second diagnosing circuit 17a outputs a second shut-off signal OUT_2 containing a pulse to a control terminal of the second transistor Tr2 to shut off the second transistor Tr2 of the shut-off circuit 14a.

The first diagnosing circuit 16a and the second diagnosing circuit 17a may output the first shut-off signal OUT_1 and the second shut-off signal OUT_2 at the same time with the same phase, or output the first shut-off signal OUT_1 and the second shut-off signal OUT_2 with different phases from each other.

DIAG_1 is a response signal that the second diagnosing circuit 17a receives from a load (drive circuit 12)-side main terminal of the first transistor Tr1, the response signal responding to the first shut-off signal OUT_1. DIAG_2 is a response signal that the first diagnosing circuit 16a receives from a load (drive circuit 12)-side main terminal of the second transistor Tr2, the response signal responding to the second shut-off signal OUT_2.

Next, self-diagnosing control in the power shut-off device 1a of the motor-drive system is described with reference to FIG. 2 to FIG. 4. The shut-off control circuit 15a regularly outputs a pulse to the control terminals of the semiconductor switching elements Tr1 and Tr2 of the shut-off circuit 14a to turn off the semiconductor switching elements Tr1 and Tr2, and makes a diagnosis as to whether or not the semiconductor switching elements Tr1 and Tr2 turn off.

In the self-diagnosing control, the first diagnosing circuit 16a outputs a first diagnostic signal containing a pulse to the control terminal of the first transistor Tr1. Meanwhile, the second diagnosing circuit 17a outputs a second diagnostic signal containing a pulse whose phase is different from that of the pulse of the first diagnostic signal to the control terminal of the second transistor Tr2.

The first diagnosing circuit 16a receives a response signal DIAG_2 from the load (drive circuit 12)-side main terminal of the second transistor Tr2, the response signal DIAG_2 responding to a second diagnostic signal OUT_2, and makes a diagnosis as to whether or not the second transistor Tr2 is operating normally. The second diagnosing circuit 17a receives a response signal DIAG_1 from the load (drive circuit 12)-side main terminal of the first transistor Tr1, the response signal DIAG_1 responding to a first diagnostic signal OUT_1, and makes a diagnosis as to whether or not the first transistor Tr1 is operating normally.

Figure 4:
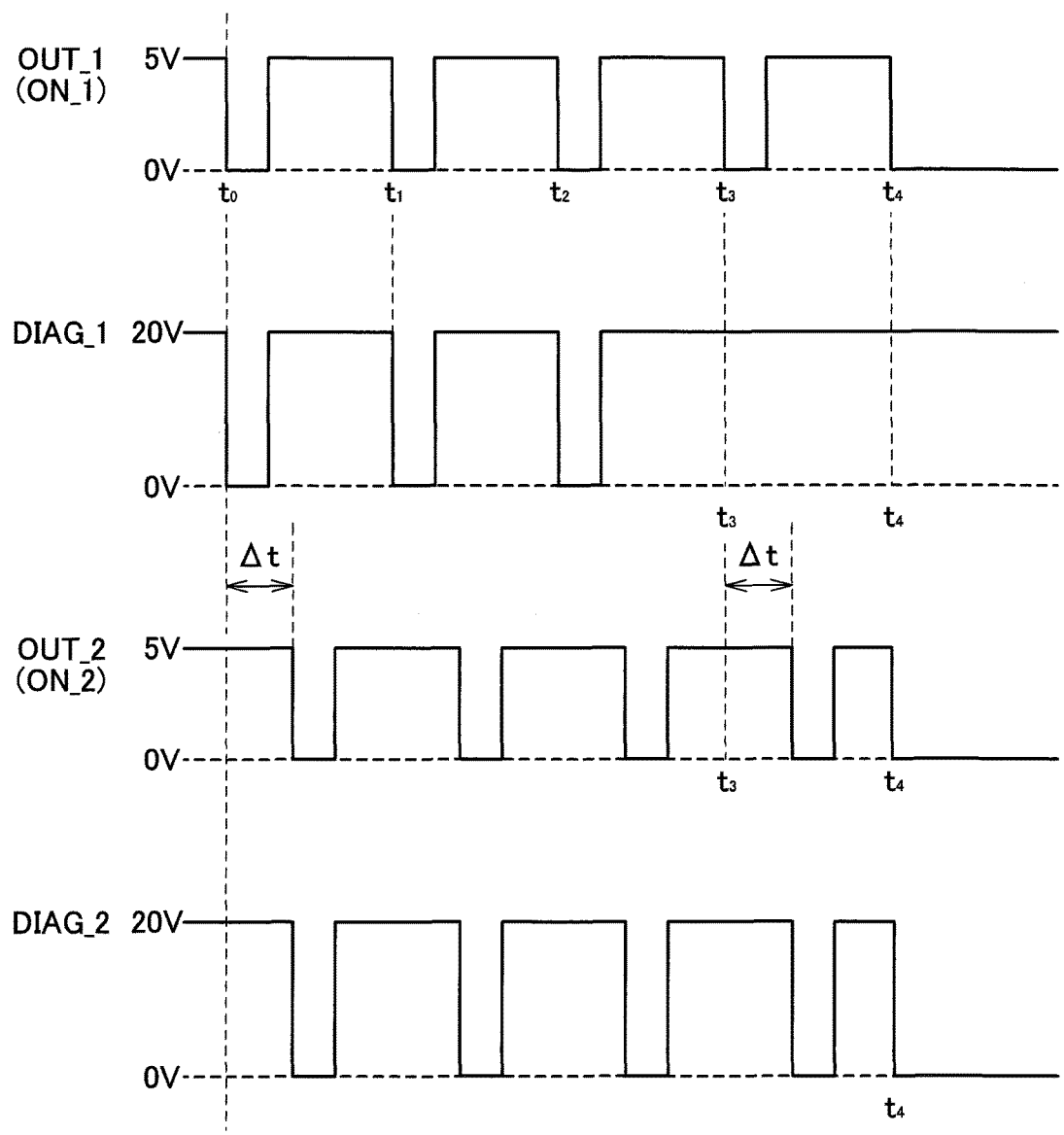
FIG. 4 is a timing chart showing timings in self-diagnosing control in the power shut-off devices shown in FIG. 2 and FIG. 3.

FIG. 4 is a timing chart showing timings in the self-diagnosing control. In FIG. 4, OUT_1 is the first diagnostic signal outputted from the first diagnosing circuit 16a to the control terminal of the first transistor Tr1 and the second diagnosing circuit 17a, and OUT_2 is the second diagnostic signal outputted from the second diagnosing circuit 17a to the control terminal of the second transistor Tr2 and the first diagnosing circuit 16a. DIAG_1 is the response signal that the second diagnosing circuit 17a receives from the load (drive circuit 12)-side main terminal of the first transistor Tr1, the response signal responding to the first diagnostic signal OUT_1, and DIAG_2 is the response signal that the first diagnosing circuit 16a receives from the load (drive circuit 12)-side main terminal of the second transistor Tr2, the response signal responding to the second diagnostic signal OUT_2.

As shown in FIG. 4, the first diagnostic signal OUT_1 and the second diagnostic signal OUT_2, whose phases are different from each other, are inputted to the shut-off circuit 14a at regular periods.

At a time t0, the second diagnosing circuit 17a receives the response signal DIAG_1 from the load (drive circuit 12)-side main terminal of the first transistor Tr1, the response signal DIAG_1 responding to the first diagnostic signal OUT_1, and makes a diagnosis on the operation of the first transistor Tr1. In this example, since the pulse signal of the response signal DIAG_1 has decreased to a low level, the second diagnosing circuit 17a makes a diagnosis that the first transistor Tr1 is operating normally.

At a time t0+Δt, the first diagnosing circuit 16a receives the response signal DIAG_2 from the load (drive circuit 12)-side main terminal of the second transistor Tr2, the response signal DIAG_2 responding to the second diagnostic signal OUT_2, and makes a diagnosis on the operation of the second transistor Tr2. In this example, since the pulse signal of the response signal DIAG_2 has decreased to a low level, the first diagnosing circuit 16a makes a diagnosis that the second transistor Tr2 is operating normally.

From the diagnostic results obtained at the times t0 to t0+Δt, the shut-off control circuit 15a determines that both the first transistor Tr1 and the second transistor Tr2 of the shut-off circuit 14a are operating normally.

At a time t3, the second diagnosing circuit 17a receives the response signal DIAG_1 from the load (drive circuit 12)-side main terminal of the first transistor Tr1, the response signal DIAG_1 responding to the first diagnostic signal OUT_1, and makes a diagnosis on the operation of the first transistor. In this example, since the pulse signal of the response signal DIAG_1 is kept to a high level, the second diagnosing circuit 17a makes a diagnosis that the first transistor Tr1 is not operating normally.

At a time t3+Δt, the first diagnosing circuit 16a receives the response signal DIAG_2 from the load (drive circuit 12)-side main terminal of the second transistor Tr2, the response signal DIAG_2 responding to the second diagnostic signal OUT_2, and makes a diagnosis on the operation of the second transistor Tr2. In this example, since the pulse signal of the response signal DIAG_2 has decreased to a low level, the first diagnosing circuit 16a determines that the second transistor Tr2 is operating normally.

From these diagnostic results, it is found out that a failure has occurred in the first transistor Tr1 although the second transistor Tr2 is operating normally. Therefore, at a time t4, the second transistor Tr2 is also shut off and the robot is stopped from operating. Then, failure recovery work is performed.

In the above-described manner, whether or not the two transistors Tr1 and Tr2, which are connected in series in the shut-off circuit 14a, are operating normally can be checked. Moreover, when a failure has occurred in the shut-off circuit 14a, which one of the two transistors (Tr1 and Tr1) has broken down can be specified. Furthermore, the two diagnosing circuits check each other in such a manner that one diagnosing circuit checks whether or not the other diagnosing circuit outputs a diagnostic signal. In this manner, an erroneous diagnosis resulting from the absence of an output diagnostic signal can be prevented. This improves safety.

Figure 5A:
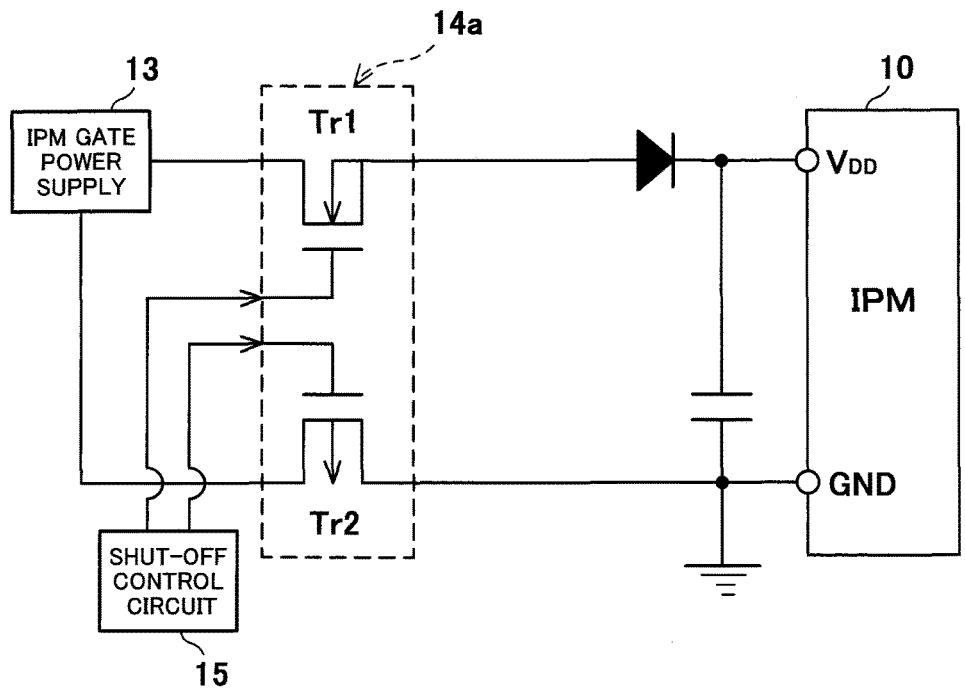
FIG. 5A and FIG. 5B are circuit diagrams showing other shut-off circuit configurations of the power shut-off devices shown in FIG. 2 and FIG. 3.
Figure 5B:
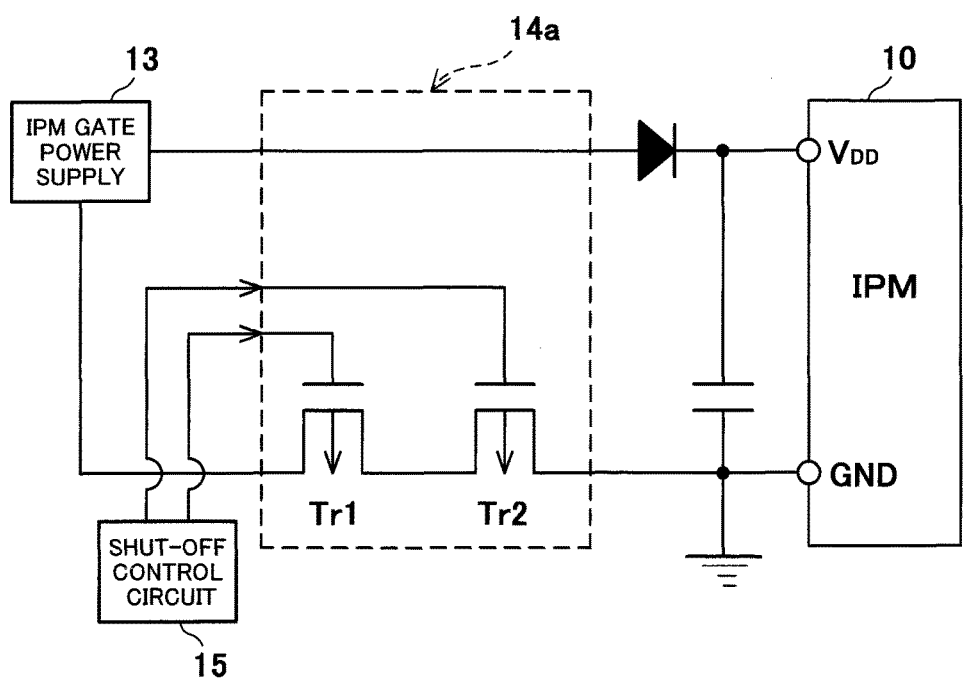

Although in the present embodiment the FETs included in the shut-off circuits 14a and 14b are both n-channel FETs, the present embodiment is not limited to such a configuration. FIG. 5A and FIG. 5B are circuit configuration diagrams showing other examples of the shut-off circuits. Alternatively, as shown in FIG. 5A, the shut-off circuit 14a or 14b may be configured by using a P-channel FET and an N-channel FET. Further alternatively, as shown in FIG. 5B, the shut-off circuit 14a or 14b may be configured by using a combination of a P-channel FET and a P-channel FET. It should be noted that in the case of using a P-channel FET, the P-channel FET is inserted in an electrical path that connects between the IPM gate power supply 13 and the GND of the drive circuits 12 of the IPM 10.

Although in the present embodiment the multi-axis robot is a six-axis articulated robot including six axes, the present embodiment is not thus limited, so long as the multi-axis robot includes at least two axes.

In the present embodiment, the shut-off circuits 14a and 14b both include the two semiconductor switching elements Tr1 and Tr2 on their corresponding electrical paths L1 and L2. The two semiconductor switching elements Tr1 and Tr2 are inserted in each electrical path in series to each other, and turn off in accordance with shut-off signals, respectively, to shut off the electrical path. However, as an alternative, the semiconductor switching elements Tr1 and Tr2 may be included in only one of the shut-off circuits.

The number of semiconductor switching elements may be three or more.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details can be substantially altered without departing from the spirit of the present invention.

INDUSTRIAL APPLICABILITY

The present invention is applicable to a multi-axis robot including a plurality of motors that drive a plurality of axes, respectively.

REFERENCE SIGNS LIST 1a, 1b power shut-off device
10 IPM
11 power converter
12 drive circuit
13 IPM gate power supply
14a, 14b shut-off circuit
15a, 15b shut-off control circuit
16a, 16b first diagnosing circuit
17a, 16b second diagnosing circuit
18 control signal generation circuit
19 brake signal generation circuit
20 brake circuit power supply
30 operating voltage generator
31 AC power supply
32 AC/DC converter
33 smoothing capacitor
40 control unit
50 brake circuit
100 multi-axis robot
200 control device

The invention claimed is:

1. A multi-axis robot power shut-off device comprising:
a plurality of motors that drive a plurality of axes of a multi-axis robot, respectively;
a plurality of power converters that control operation of the plurality of motors, respectively, by supplying and controlling electric power to the plurality of motors;
drive circuits, each of which drives first semiconductor switching elements included in a corresponding one of the power converters by outputting drive signals to control terminals of the first semiconductor switching elements in accordance with control signals for controlling the operation of the motors;
a first shut-off circuit provided at a non-end position in a first electrical path, through which first operating power is supplied to the drive circuits;
a plurality of solenoid brakes that apply a brake to the plurality of axes, respectively;
a second shut-off circuit provided at a non-end position in a second electrical path, through which second operating power is supplied to the solenoid brakes; and
a shut-off control circuit that outputs shut-off signals to the first and second shut-off circuits, wherein
at least one of the first and second shut-off circuits (hereinafter, a specific shut-off circuit) includes at least two second semiconductor switching elements that are inserted in series to each other in one of the first and second electrical paths (hereinafter, a specific electrical path) that corresponds to the specific shut-off circuit, the second semiconductor switching elements turning off in accordance with the shut-off signals, respectively, to shut off the specific electrical path.

2. The multi-axis robot power shut-off device according to claim 1, wherein
the shut-off control circuit regularly outputs a pulse to control terminals of the second semiconductor switching elements to turn off the second semiconductor switching elements, and makes a diagnosis as to whether or not the second semiconductor switching elements turn off.

3. The multi-axis robot power shut-off device according to claim 2, wherein
in a case of defining the drive circuits and the solenoid brakes as loads, defining one of the at least two second semiconductor switching elements as a power-supply-side semiconductor switching element, and defining another one of the second semiconductor switching elements that is positioned closer to the loads than the power-supply-side semiconductor switching element as a load-side semiconductor switching element, the shut-off control circuit further includes:
a first diagnosing circuit that outputs a first diagnostic signal containing the pulse to the control terminal of the power-supply-side semiconductor switching element; and
a second diagnosing circuit that outputs a second diagnostic signal containing the pulse whose phase is different from that of the pulse of the first diagnostic signal to the control terminal of the load-side semiconductor switching element,
the first diagnosing circuit receives a response signal from a main terminal, at the load side, of the load-side semiconductor switching element, the response signal responding to the second diagnostic signal, and makes a diagnosis as to whether or not the load-side semiconductor switching element is operating normally, and
the second diagnosing circuit receives a response signal from a main terminal, at the load side, of the power-supply-side semiconductor switching element, the response signal responding to the first diagnostic signal, and makes a diagnosis as to whether or not the power-supply side semiconductor switching element is operating normally.

4. A multi-axis robot comprising the power shut-off device according to claim 1.

5. A multi-axis robot comprising the power shut-off device according to claim 2.

6. A multi-axis robot comprising the power shut-off device according to claim 3.

* * * * *